G. L. PATTERSON.
BATTERY HOLDER SYSTEM.
APPLICATION FILED MAR. 5, 1909.

953,640.

Patented Mar. 29, 1910.

3 SHEETS—SHEET 1.

Witnesses:

Inventor
G. L. PATTERSON.

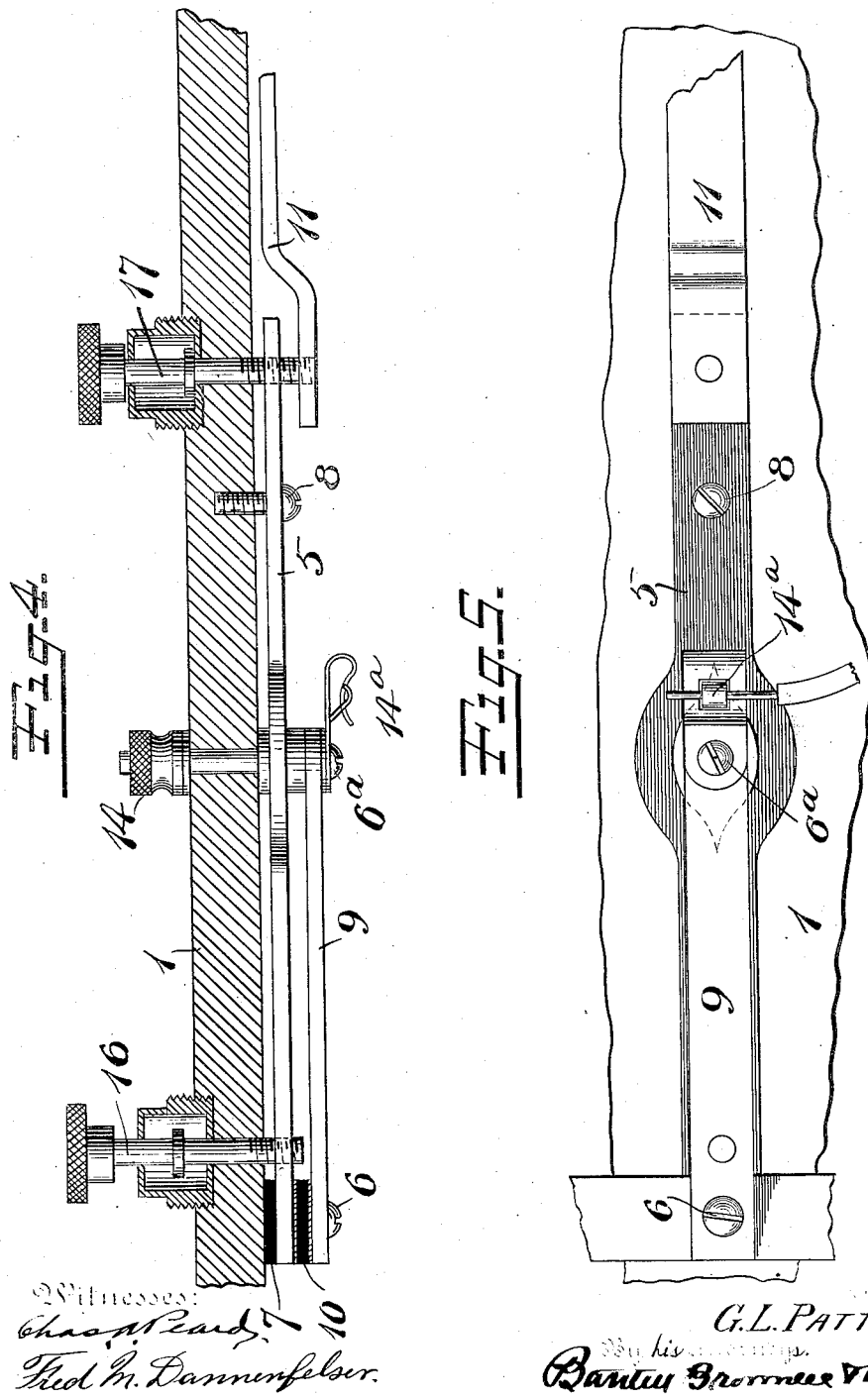

G. L. PATTERSON.
BATTERY HOLDER SYSTEM.
APPLICATION FILED MAR. 5, 1909.

953,640.

Patented Mar. 29, 1910.

3 SHEETS—SHEET 3.

Witnesses:
Chas. A. Peard
Fred M. Dannenfelser

Inventor
G. L. PATTERSON.
By his Attorneys

UNITED STATES PATENT OFFICE.

GEORGE LEWIS PATTERSON, OF NEW YORK, N. Y., ASSIGNOR TO ALICE C. PATTERSON, OF NEW YORK, N. Y.

BATTERY-HOLDER SYSTEM.

953,640.   Specification of Letters Patent.   Patented Mar. 29, 1910.

Application filed March 5, 1909. Serial No. 481,489.

To all whom it may concern:

Be it known that I, GEORGE L. PATTERSON, a citizen of the United States, residing at New York, New York county, New York State, have invented certain new and useful Improvements in Battery-Holder Systems, of which the following is a full, clear, and exact description.

My invention relates to improved battery cell holders and circuit controlling devices, the object of the invention being to provide very simple and effective mechanism for carrying and controlling the circuits of a group of battery cells whereby all of the cells may be connected in series; or, said cells may be divided into two groups, both groups being connected in multiple series; or, the cells may be divided into two groups, the cells in each group being connected in series, so that said groups may be used separately.

Figure 1:
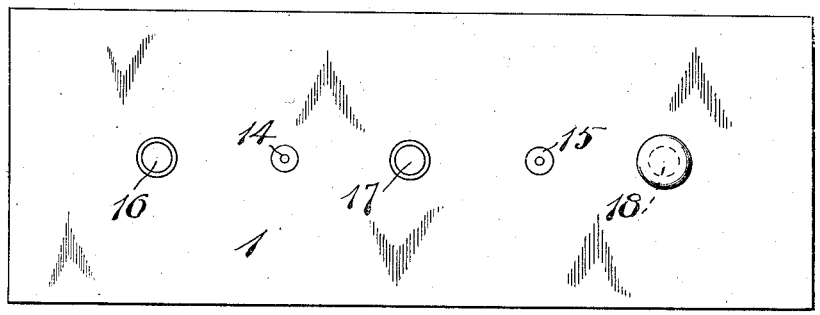
Figure 2:
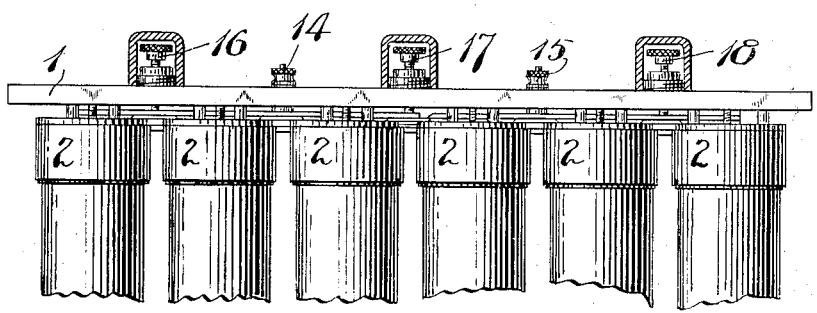
Figure 3:
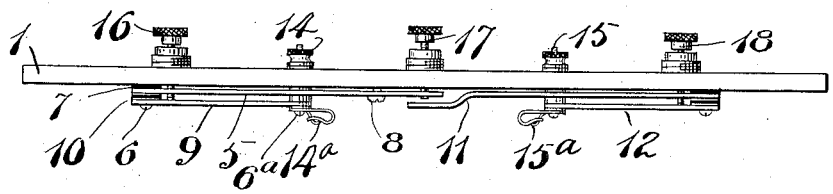

In the accompanying drawings, Figure 1 is a plan view of my improved holder showing the location of the terminals and the circuit controllers. Fig. 2 is a side elevation, partly in section, the lower ends of the several cells being broken away. Fig. 3 is a side elevation of Fig. 1 without the cells. Fig. 4 is a relatively enlarged longitudinal sectional view of the middle and left hand end of the holder shown in Fig. 3. Fig. 5 is a view of the under-side of the parts shown in Fig. 4. Figs. 6, 7, 8 and 9 illustrate diagrammatically the different circuit arrangements.

1 represents a holder head, provided at its under side with the suitable sockets or cell connectors 2—2. It will be unnecessary for me to describe in detail the particular construction of these sockets, but it is preferred that they be constructed after the manner set forth in the Gill patent, No. 705,919, dated July 29th, 1902, whereby when a cell is introduced into a socket, it is by the mere act of introduction connected up in the circuit, the socket being provided with suitable self-contained terminals arranged to make electrical connection with the positive and negative electrode of the cell. As shown in Fig. 2, these sockets are arranged in line, and as shown in Figs. 6 to 9, there are two lines or sets of sockets and batteries. In these figures, 3—3 represent one set or series of cells, while 4—4 represent a second set or series of cells. As already explained, my invention aims to provide a simple means for connecting either of these sets in straight series in a working circuit; or, putting both of said sets in multiple series in the same circuit; or, connecting both sets in straight series. This end I attain by the use of very simple means, which I will now describe.

5 is a connector, of conducting material, and preferably in the form of a bar. This bar 5 is connected at one end by a suitable fastening such as a screw or bolt 6 to the head 1, said bar being suitably insulated therefrom. In this particular disclosure, 7 represents insulation. The other end of the bar 5 is also suitably held as by a screw 8. 9 is another bar or connector held by screws and bolts 6—6ª and insulated from the bar 5. 11 is still another bar attached to the head 1 in any suitable manner, and overlapping the end of bar 5 but electrically disconnected therefrom under certain conditions. 12 is a bar corresponding to the bar 9 but mounted at the opposite end of the head 1. These bars 11—12 are insulated from one another, the same as bars 5 and 9, the insulation in each instance being effected in any suitable manner. 14 is a terminal connector normally connected with bar 9. 15 is another terminal connector normally connected with bar 12. 16 is a circuit closer of any suitable form, in this instance, in the form of a screw accessible from above, the stem of the screw being normally connected with the bar 5 and being adapted to be screwed down so as to electrically connect bars 5 and 9. 17 is another connector normally electrically connected with bar 5 and capable of connecting bar 5 with bar 11. 18 is another connector normally connected with bar 11 and capable of connecting bar 11 with bar 12. Now, turning to the circuits, shown in Figs. 6 to 9, the arrangement and operation will be readily apparent.

Figure 6:
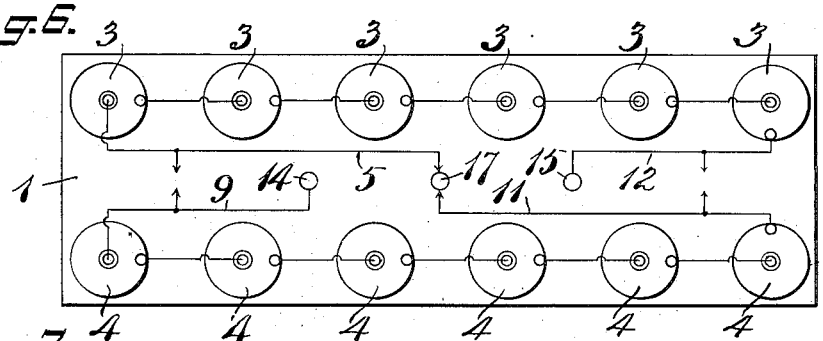

In Fig. 6 the numerals 5—9 and 11—12 illustrate conventionally and diagrammatically the bars correspondingly numbered in the preceding figures, respectively. One terminal of one of the end cells 3—3 is connected to the bar 5; the opposite terminal of the other end cell of the same series being connected with bar 12. One terminal of one of the end cells of the series 4—4 is connected to the bar 9; the opposite terminal of the other end cell of said series being connected to the bar 11.

In Fig. 6 the bars 5 and 11 are electrically connected by the closer 17. The circuit will then be as follows: from terminal 14, through the series of cells 4, thence to bar 11, through closer 17 to bar 5, through the series of cells 3—3, thence through bar 12 to terminal 15.

Figure 7:
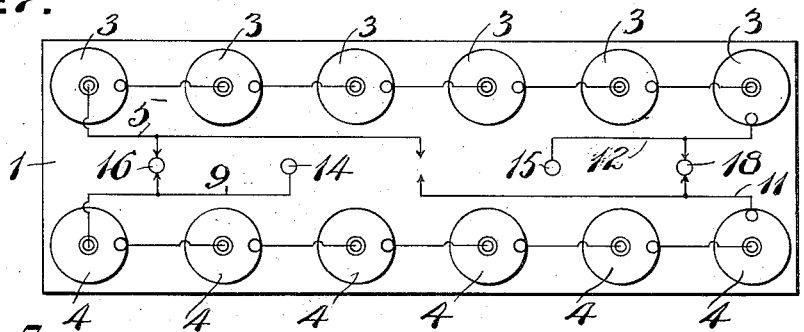

In Fig. 7, the bars 5 and 9 are electrically connected by the connector or closer 16. Bars 11—12 are connected by closer 18. Bars 5—11 are disconnected. Both sets of cells will now be in multiple series as follows: from terminal 14, through wire 9 to the series 4—4, through wire 11, circuit closer 18, wire 12 to terminal 15. At the same time, a circuit is also completed through closer 16, wire 5, cells 3—3, and through wire 12 to binding post 15, thus giving the voltage of one-half of all the cells but the amperage of two cells.

Figure 8:
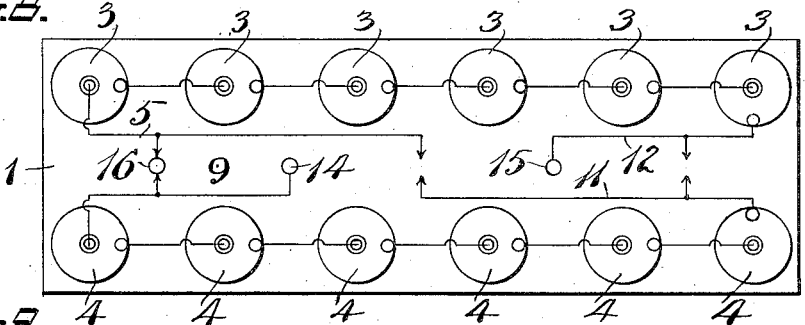

In Fig. 8, the wires 5—11 are disconnected and 11—12 are disconnected, but, wires 5—9 are connected by closer 16. The circuit will now be as follows: from terminal 14, through wire 9, closer 16, wire 5, cells 3—3, wire 12 to terminal 15. In this view, the series of cells 4 are at rest, the circuit being broken at wire 11.

Figure 9:
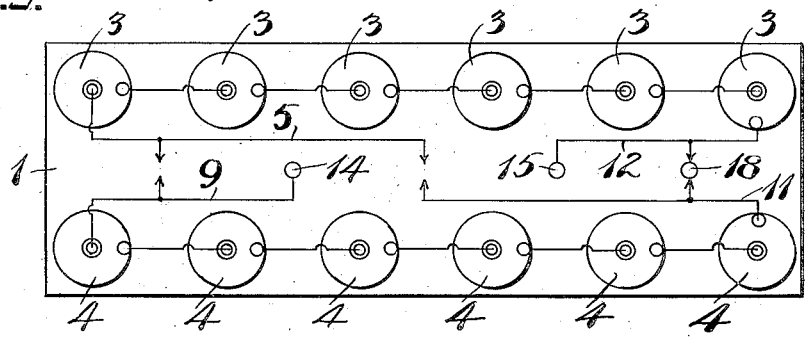

In Fig. 9 the cells 3—3 are at rest and the circuit is closed through cells 4—4, the arrangement being as follows: the wires 5—9, 5—11 are disconnected and the wires 11—12 are connected by closer 18. The circuit will then be as follows: from terminal 14 through wire 9, cells 4—4, wire 11, circuit closer 18 and wire 12 to terminal 15.

By this arrangement and construction of battery cells is afforded a convenient and effective means for connecting the cells up in the combinations hereinbefore referred to. If desired, the binding posts 14—15 may have the spring clips 14ª—15ª at their inner ends for the purpose of wiring up the old type of non-socket battery cells, thus making the apparatus universally available.

In the preferred construction, the head 1 is made of insulating material, and where the circuit closers 16, 17 and 18 are arranged, it is preferred to provide a protecting cap for each closer, as indicated in section, Fig. 2, but this, of course, is not essential. When present these caps prevent tampering with the adjustments.

It is immaterial what sort of binding posts, terminal outlets or circuit closers are employed, it being understood that those terms are used generically to cover and include any devices capable of performing the function ascribed to said parts.

What I claim is:

1. A combined holder and connector for battery cells comprising a holder element, two outlet terminals therefor, means carried thereby for taking two sets of cells, and for connecting the cells of each set in series, a connector for connecting the positive electrode of one set directly to one of said terminals, a connector for connecting the negative electrode of the other set directly to the other terminal, a common circuit closer, a connector for the opposite electrode of each set respectively, leading to said circuit closer, and other circuit closers for the last mentioned connectors arranged to connect and disconnect the same respectively with the first mentioned connectors simultaneously or independently.

2. A circuit system for two sets of battery cells in which the cells of each set are connected in series, comprising two terminals, a connector arranged to connect one of said terminals with a positive pole of one set of cells, a connector arranged to connect the other terminal with the negative pole of the other set, a common circuit closer, a connector for the opposite pole of each set respectively leading to said circuit closer, and another circuit closer arranged to connect one of the last mentioned connectors with that one of the first-mentioned connectors connected with a similar pole.

3. A circuit system for two sets of battery cells in which the cells of each set are connected in series, comprising two terminals, a connector arranged to connect one of said terminals with one pole of one set of cells, a connector arranged to connect the other terminal with the opposite pole of the other set, a common circuit closer, a connector for the remaining pole of each set respectively leading to said circuit closer, another circuit closer arranged to connect one of said last mentioned connectors with that one of the first mentioned connectors connected with a similar pole, and a third circuit closer arranged to connect the other of the first mentioned connectors with the other of the second mentioned connectors.

4. In an apparatus of the character described, a head having battery holding and connecting devices carried thereby and arranged to hold two sets of cells and to connect the cells of each set in series, two binding posts or terminals for a working circuit carried by said head, connectors and circuit closers also carried by said head comprising a connector arranged to connect one of said terminals with the positive pole of one set of cells, a connector arranged to connect the other terminal with the negative pole of the other set, a circuit closer, a connector for the opposite pole of each set respectively leading to said circuit closer, and two other circuit closers arranged respectively to connect the connectors leading from similar poles of each set whereby said sets of cells may be connected in said working circuit alternately or all in a single series or in multiple series.

GEORGE LEWIS PATTERSON.

Witnesses:
R. C. MITCHELL,
M. E. GARRETT.